United States Patent [19]

Smeets

[11] Patent Number: 5,286,958
[45] Date of Patent: Feb. 15, 1994

[54] METHOD AND SYSTEM FOR RECORDING A NEW CODED MESSAGE IN PLACE OF AN OLD CODED MESSAGE RECORDED ON A MAGNETIC STRIPE CARRIED BY A SUPPORT DOCUMENT BY MANUAL DISPLACEMENT OF THE DOCUMENT

[75] Inventor: Jacques Smeets, La Ferte Alais, France

[73] Assignee: Compagnie Generale D'Automatisme CGA-HBS, Bretigny sur Orge, France

[21] Appl. No.: 952,681

[22] Filed: Sep. 28, 1992

[30] Foreign Application Priority Data

Oct. 4, 1991 [FR] France .................. 91 12241

[51] Int. Cl.$^5$ ............................................. G06K 7/08
[52] U.S. Cl. ...................................... 235/449; 360/2; 235/493
[58] Field of Search ....................... 235/449, 482, 493; 360/2

[56] References Cited

U.S. PATENT DOCUMENTS

| | | | |
|---|---|---|---|
| 3,869,700 | 3/1975 | Cook et al. | 360/2 X |
| 4,225,780 | 9/1980 | Jacoub | 235/449 |
| 4,228,348 | 10/1980 | Lee | 235/449 |
| 4,304,992 | 12/1981 | Kobashi et al. | 235/449 |
| 4,507,550 | 3/1985 | Fleer | 235/449 |

FOREIGN PATENT DOCUMENTS

| | | |
|---|---|---|
| 2501401 | 9/1982 | France . |
| 2637102 | 3/1990 | France . |
| 2015218 | 9/1979 | United Kingdom . |

Primary Examiner—Michael C. Wimer
Assistant Examiner—Adrian Young
Attorney, Agent, or Firm—Sughrue, Mion, Zinn, Macpeak & Seas

[57] ABSTRACT

In a method for recording a new coded message in place of an old coded message recorded on a magnetic stripe carried by a support document by manual displacement of said document, the message being divided into a first part and a second part separated by a gap, the clock signal used to write the first part of the new message is a clock signal obtained by reading the second part of the old message. The clock signal used to write the second part of the new message is a clock signal obtained by reading the first part of the new message, newly written. The system for implementing this method comprises a write head between two synchronization heads and an electronic circuit which produces from the signals from the two synchronization heads a clock signal slaved to the speed of displacement of the support document. This clock signal is sent to a write signal generator connected to the write head. The write signal generator also receives the data to be recorded.

3 Claims, 2 Drawing Sheets

METHOD AND SYSTEM FOR RECORDING A NEW CODED MESSAGE IN PLACE OF AN OLD CODED MESSAGE RECORDED ON A MAGNETIC STRIPE CARRIED BY A SUPPORT DOCUMENT BY MANUAL DISPLACEMENT OF THE DOCUMENT

BACKGROUND OF THE INVENTION

1. Field of the Invention

The present invention concerns a method for recording a new coded message in place of an old coded message recorded on a magnetic stripe carried by a support document by manual displacement of said document.

2. Description of the Prior Art

There are many applications where a magnetic message is to be read and modified.

This applies to prepaid transport tickets, for example. It is advantageous if the ticket read-write system is a system relying on manual displacement of the ticket as this avoids the need for a drive system requiring complex mechanical parts. Also, a manual displacement system is less vulnerable to vandalism.

However, in a manual displacement system the problem arises of the linear density of the "bits" of the magnetic code at the time of writing which must be independent of the speed and variations in the speed with which the ticket is moved across the read-write system.

French patent 2 637 102 describes a system for reading and encoding a magnetic stripe by manual displacement of the support document.

The principle of the system is that the magnetic stripe comprises a fixed coded first message followed by a variable coded second message modified each time that the ticket is passed through the read-write system. By means of a read head the fixed first message is used to synchronize the writing of the second part of the magnetic stripe by a write head.

This system has the drawback that it enables "writing" only on the second part of the magnetic stripe, the message on the first part of the stripe being invariant and used to synchronize writing on the second part of the stripe.

An object of the present invention is to enable modifiable writing on all of the length of the magnetic stripe.

SUMMARY OF THE INVENTION

In one aspect, the present invention consists in a method for recording a new coded message in place of an old coded message recorded on a magnetic stripe carried by a support document by manual displacement of said document past processor units, said old and new coded messages being produced by a coding system with its own clock signal and comprising a first part and a second part of substantially the same length separated by a gap, in which method a) the first part of the new coded message is recorded on the first part of the stripe while reading the second part of the old message on the second part of the stripe, said reading being used to synchronize the writing of the first part of the new message to a clock signal obtained by reading said second part of the old message, b) the second part of the new coded message is recorded on the second part of the stripe while reading the first part of the new coded message recorded in a) on the first part of the stripe, said reading being used to synchronize the writing of the second part of the new message to a clock signal obtained by reading said first part of said new message.

In a second aspect, the present invention consists in a system for implementing a method for recording a new coded message in place of an old coded message recorded on a magnetic stripe carried by a support document by manual displacement of said document past processor units, said old and new coded messages being produced by a coding system with its own clock signal and comprising a first part and a second part of substantially the same length separated by a gap, in which method a) the first part of the new coded message is recorded on the first part of the stripe while reading the second part of the old message on the second part of the stripe, said reading being used to synchronize the writing of the first part of the new message to a clock signal obtained by reading said second part of the old message, b) the second part of the new coded message is recorded on the second part of the stripe while reading the first part of the new coded message recorded in a) on the first part of the stripe, said reading being used to synchronize the writing of the second part of the new message to a clock signal obtained by reading said first part of said new message, which system comprises three aligned magnetic heads of which the first encountered by the support document as it moves past the system is a read head called a first synchronization head, the second is a write head and the third is a read head called the second synchronization head, said write head being connected to a write signal generator receiving as input the data of said new message to be recorded and a clock signal slaved to the speed of displacement of said support document, said clock signal being produced by an electronic circuit receiving as input signals from said first and second synchronization heads.

The system advantageously further comprises a fourth magnetic head which is a read head aligned with the other three heads and situated in front of said first synchronization head, said read head being connected to a decoder module connected to a processor module which produces said data of the new message to be recorded which is sent to said write signal generator.

A specific embodiment of the invention will now be described in its application to transport tickets and with reference to the appended drawings.

DETAILED DESCRIPTION OF THE INVENTION

Figure 1:
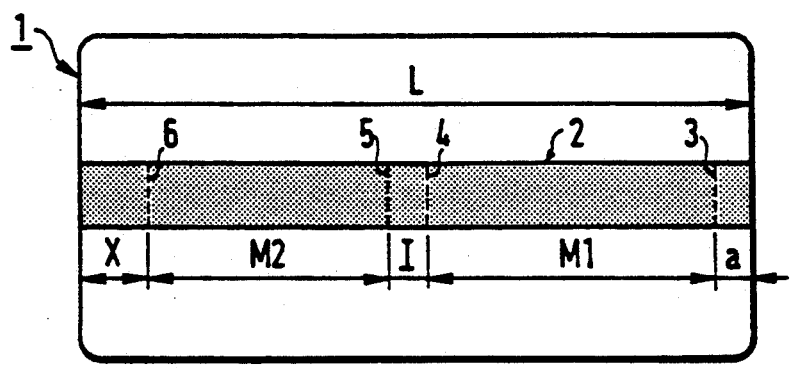
FIG. 1 shows a support document carrying a magnetic stripe used as a transport ticket.

FIG. 1 shows a transport ticket 1 which comprises a magnetic stripe 2. A coded message is recorded on the magnetic stripe 2 divided into two substantially equal length parts M1 and M2 between which is a gap I.

The vertical lines 3, 4, 5 and 6 symbolize the physical limits of these parts of the message.

The message is a variable message in that it is replaced by a new message each time that the ticket is moved past a read and encode system disposed in a device controlling access to a place enabling use of transport means. This variable message comprises a code representing a certain number of transport units, for example, this number being decremented each time the ticket is passed through the system.

L denotes the total length of the magnetic stripe 2 and a denotes the length of the stripe before the first part of the message begins. Both parts of the message are produced by a coding system with its own clock, using the F/2F, split-phase, etc codes, for example.

Figure 2:
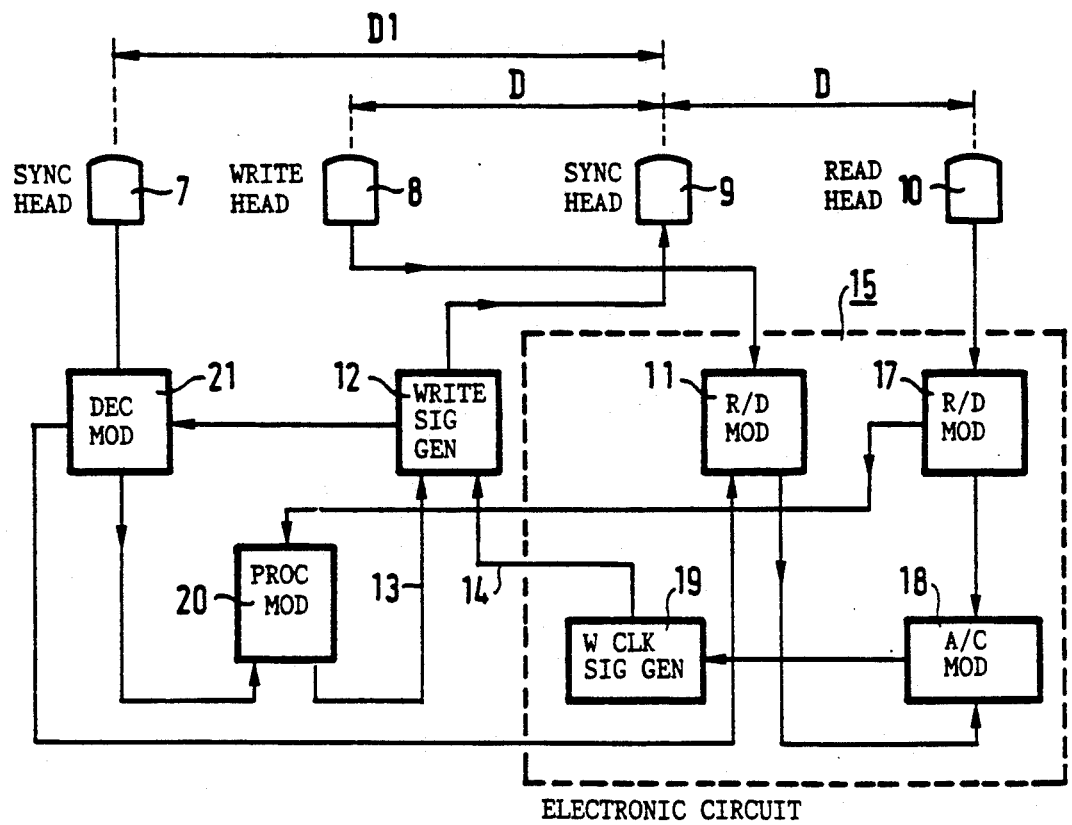
FIG. 2 is a diagrammatic representation of a system in accordance with the invention for reading and writing on the magnetic stripe of the support document shown in FIG. 1 by manual displacement of the support document past the read and write means.

Referring to FIG. 2, the read and encode system comprises read and write means comprising four aligned magnetic heads: a first magnetic head 8 which is a read head called the first synchronization head, a second magnetic head 9 which is a write head, a third magnetic head 10 which is a read head called the second synchronization head and finally a fourth magnetic head 7 which is a read head and which precedes the first synchronization head 8.

The write head 9 receives a write signal produced by a write signal generator 12 which receives at an input 13 the data of the new coded message to be recorded on the magnetic stripe 2 and on an input 14 a write clock signal produced by an electronic circuit 15. The data sent to the input 13 is supplied by a processor module 20.

The processor module 20 receives data from a decoder module 21 connected to the read head 7.

The electronic circuit 15 comprises a first reader-decoder module 17 connected to the second synchronization head 10, a second reader-decoder module 11 connected to the first synchronization head 8, an analyzer/control module 18 receiving the output signals of the reader/decoder modules 11, 17 and finally a write clock signal generator 19 receiving at its input the signals from the analyzer/control module 18.

The reader/decoder module 17 is connected to the processor module 20, the decoder module 21 is connected to the reader/decoder module 11 and the write signal generator 12 is connected to the decoder module 21.

As the transport ticket 1 is moved from left to right it first passes across the read head 7 and the two parts M1 and M2 of the coded message are read and decoded in the module 21. When the first part M1 of the message reaches the first synchronization head 8 nothing happens unless the reader-decoder module 11 is enabled by the decoder module 21. This sends an enabling signal to the module 11 only if it has decided that the read head 7 has finished reading the complete message. At this time the transport ticket is in the position shown in FIG. 3 relative to the four magnetic heads. The decoder module 21 enables the reader-decoder module 11. In this module 11 the magnetic transitions of the part M2 of the message passing across the first synchronization head are read and decoded and the clock signal is separated out from the data extracted from the received signal. This signal is sent to the analyzer-control module 18. The time lapse between the various "bits" seen by the head 8 varies depending on the speed at which the transport ticket 1 moves across the first synchronization head 8. The module 18 measures the time lapse between transitions and recalculates the basic timing which is used to produce the write clock signal. The output of the analyzer-control module 18 is connected to the clock signal generator 19 which produces the clock signal slaved to the speed of displacement of the transport ticket 1 on the basis of computation elements based on the analysis carried out in the module 18.

When data is present at input 13 the arrival of the write clock signal at input 14 of the write signal generator 12 causes a write signal to be generated and the write head 9 to record the first part M1 of the new coded message. On completion of writing of the first part M1 of the message the write signal generator 12 resets the module 21 and the position is then such that the first part M1 of the newly written message is approaching the second synchronization head 10. The reader-decoder module 17 then performs the same function as the module 11 did previously and the modules 18, 19 and 12 function as previously and the write head 9 records the second part M2 of the new coded message.

All of the system is housed in an access control point, the four magnetic heads 7, 8, 9 and 10 being aligned facing a longitudinal slot along which the user moves his transport ticket 1 by hand.

Figure 3:
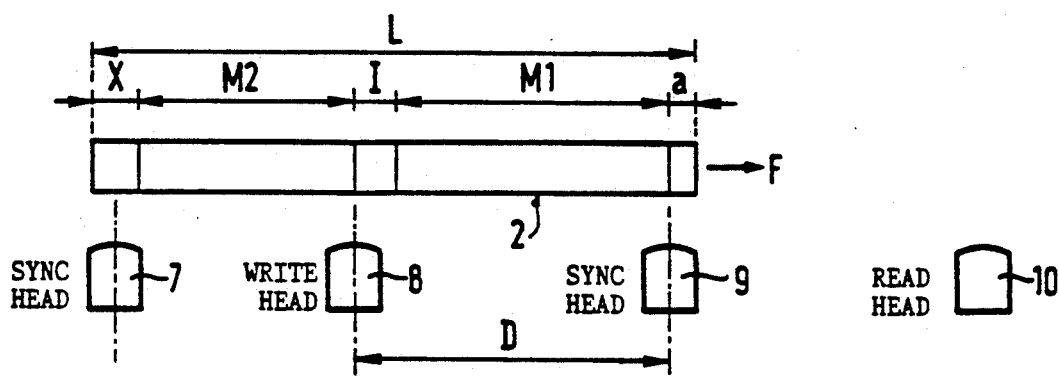
FIGS. 3 and 4 are diagrams showing two characteristics positions of the support document relative to the magnetic heads during its manual displacement past the magnetic heads.
Figure 4:
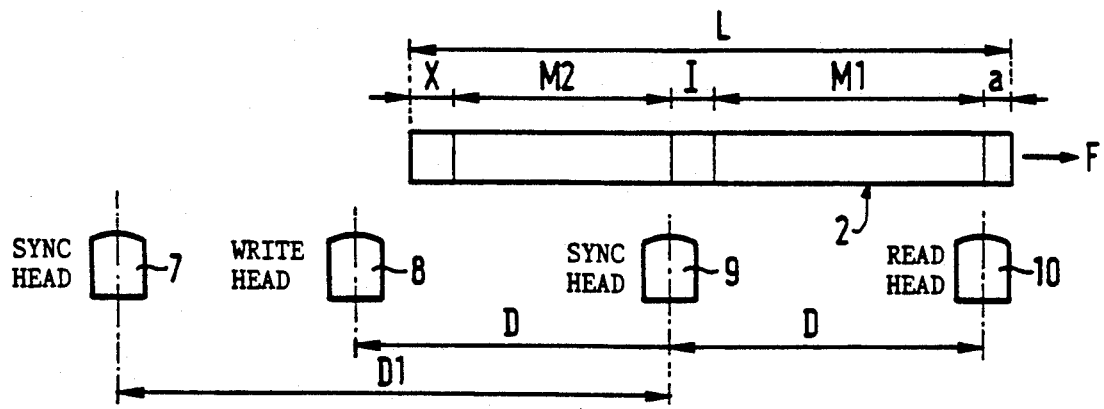

FIGS. 3 and 4 show two stages in the movement of the ticket past the magnetic heads. These figures show only the magnetic stripe 2 and the four magnetic heads 7, 8, 9 and 10. The arrow F shows the direction in which the ticket carrying the stripe 2 is moved.

In the position shown in FIG. 3 the read head 7 has finished reading all of the coded message which means that the module 11 can now be enabled. The first synchronization head 8 reads the part M2 of the old message which is used to synchronize the write head 9 for writing the first part M1 of the new message.

In the position shown in FIG. 4 the beginning of the first part M1 of the newly written message has reached the second synchronization head 10 which causes the write head 9 to write the second part M2 of the new message.

In FIG. 3, note that at the start of writing of the first part M1 of the new message by the write head 9 the read head 10 has finished reading the complete message and the processor module 20 can supply to the input 13 the new data to be recorded.

From the FIG. 4 position the second synchronization head 10 check reads both parts M1 and M2 of the newly written message using the reader-decoder module 17 and the processor module 20 which is connected to the module 17.

The lengths M1 and M2 of the two parts of the message must be equal or substantially equal.

Thus: $M1 = M2 = M$. If a is the length of stripe before the start of M1, the total length L of the magnetic stripe must be such that:

$$L \geq 2M + I + a$$

where I is the length of the gap between the two parts of the message.

This implies that:

$$L = 2M + I + a + x$$

where $x > 0$.

This distance is that following the end of the second part M2 of the message.

The distances D1 between the read head 7 and the write head 9 and D between the write head 9 and either synchronization head 8 or 10 must then meet the following conditions:

$$D1 \geq 2M+I$$

$$D \geq M+I$$

$$D \leq M+I+a$$

$$D \leq L-(M+a) \rightarrow D \leq M+I+x$$

whence:

| | |
|---|---|
| 1) if x = 0 | D = M + I |
| 2) if 0 < x < a | M + I ≤ D ≤ M + I + x |
| 3) if x ≥ a | M + I ≤ D ≤ M + I + a |

Note that the signal enabling the reader-decoder module 11 may be provided by a position sensor which detects when the first synchronization head 8 reaches the start of the second part M2 of the message. This may be achieved, for example, by means of a decoder module connected to the synchronization head 8 which recognizes a first message followed by an interruption and which supplies the enabling signal at the start of a new message, in this instance M2.

There is claimed:

1. Method for recording a new coded message in place of an old coded message recorded on a magnetic stripe carried by a support document by manual displacement of said document past processor units, said old and new coded messages being produced by a coding system with its own clock signal and comprising a first part and a second part of substantially the same length separated by a gap, in which method
    a) said first part of said new coded message is recorded on a first part of said stripe while reading said second part of said old message on a second part of said stripe, said reading being used to synchronize the writing of said first part of said new message to a clock signal obtained by reading said second part of said old message,
    b) said second part of said new coded message is recorded on said second part of said stripe while reading said first part of said new coded message recorded in a) on said first part of said stripe, said reading being used to synchronize the writing of said second part of said new message to a clock signal obtained by reading said first part of said new message.

2. System for implementing a method for recording a new coded message in place of an old coded message recorded on a magnetic stripe carried by a support document by manual displacement of said document past processor units, said old and new coded messages being produced by a coding system with its own clock signal and comprising a first part and a second part of substantially the same length separated by a gap, in which method
    a) said first part of said new coded message is recorded on a first part of said stripe while reading said second part of said old message on a second part of said stripe, said reading being used to synchronize the writing of said first part of said new message to a clock signal obtained by reading said second part of said old message,
    b) said second part of said new coded message is recorded on said second part of said stripe while reading said first part of said new coded message recorded in a) on said first part of said stripe, said reading being used to synchronize the writing of said second part of said new message to a clock signal obtained by reading said first part of said new message, which system comprises three aligned magnetic heads of which the first encountered by said support document as it moves past said system is a read head called a first synchronization head, the second is a write head and the third is a read head called the second synchronization head, said write head being connected to a write signal generator receiving as input the data of said new message to be recorded and a clock signal slaved to the speed of displacement of said support document, said clock signal being produced by an electronic circuit receiving as input signals from said first and second synchronization heads.

3. System according to claim 2 further comprising a fourth magnetic head which is a read head aligned with the other three heads and situated in front of said first synchronization head, said read head being connected to a decoder module connected to a processor module which produces said data of the new message to be recorded which is sent to said write signal generator.

* * * * *